(12) United States Patent
Kalegin et al.

(10) Patent No.: US 12,292,985 B2
(45) Date of Patent: May 6, 2025

(54) SYSTEM AND METHOD FOR DETECTING A HARMFUL SCRIPT BASED ON A SET OF HASH CODES

(71) Applicant: AO Kaspersky Lab, Moscow (RU)

(72) Inventors: Andrei I. Kalegin, Moscow (RU);
Vitaly V. Butuzov, Moscow (RU);
Dmitry N. Glavatskikh, Moscow (RU);
Denis I. Parinov, Moscow (RU);
Alexey M. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 227 days.

(21) Appl. No.: 17/939,071

(22) Filed: Sep. 7, 2022

(65) Prior Publication Data

US 2023/0297703 A1    Sep. 21, 2023

(30) Foreign Application Priority Data

Mar. 17, 2022    (RU) .................................. 2022107038

(51) Int. Cl.
*G06F 21/56* (2013.01)
*G06F 21/62* (2013.01)

(52) U.S. Cl.
CPC ........ *G06F 21/6209* (2013.01); *G06F 21/562* (2013.01); *G06F 21/566* (2013.01); *G06F 21/565* (2013.01); *G06F 2221/034* (2013.01)

(58) Field of Classification Search
CPC ...... G06F 21/50; G06F 21/561; G06F 21/562; G06F 21/563; G06F 21/565; G06F 21/566; G06F 21/6209
See application file for complete search history.

(56) References Cited

U.S. PATENT DOCUMENTS

| | | | |
|---|---|---|---|
| 7,707,634 B2 | 4/2010 | Sandu et al. | |
| 2011/0154495 A1* | 6/2011 | Stranne | G06F 21/564 706/13 |
| 2017/0004310 A1* | 1/2017 | Ivanov | G06F 21/565 |
| 2017/0093893 A1 | 3/2017 | Davydov et al. | |
| 2018/0096148 A1 | 4/2018 | Sejtko | |
| 2020/0364338 A1* | 11/2020 | Ducau | G06F 21/564 |
| 2023/0029250 A1* | 1/2023 | Abdelaziz | G06N 5/04 |
| 2024/0354424 A1* | 10/2024 | Najafirad | G06F 21/577 |

FOREIGN PATENT DOCUMENTS

CN    113448545 A  *  9/2021

* cited by examiner

*Primary Examiner* — Shaqueal D Wade-Wright
(74) *Attorney, Agent, or Firm* — ArentFox Schiff LLP; Michael Fainberg (57) ABSTRACT

Disclosed herein are systems and methods for detecting harmful scripts. In one aspect, an exemplary method comprises, identifying a file containing a script, wherein the identification of the file is performed by analyzing each file of a plurality of files for a presence of a harmful script, generating a summary of the script based on the identified file, calculating static and dynamic parameters of the generated summary of the script, recognizing a script programming language based on the calculated static parameters and dynamic parameters of the generated summary of the script using at least one language recognition rule, processing the identified file based on the data about the recognized script programming language, generating a set of hash codes based on a processed file using rules for generating hash codes, and detecting the harmful script when the generated set of hash codes is similar to known harmful sets of hash codes.

20 Claims, 4 Drawing Sheets

```
... Other parts of the file ...
PROG=$(basename $0 ctl)adm
echo 1>&2 "$(basename $0) depricated, please use $PROG in the future"
if [ $# -lt 2 ] ; then
    echo "Usage: $(basename $0) -[deu] user [...]" 1>&2
    exit 1
Fi
FLAG=$1
Shift
for i; do
    ARGS=" $FLAG $i"
done
echo 1>&2 "Executing: $PROG$ARGS"
exec $PROG$ARGS
... Other parts of the file ...
```

SYSTEM AND METHOD FOR DETECTING A HARMFUL SCRIPT BASED ON A SET OF HASH CODES

CROSS REFERENCE TO RELATED APPLICATIONS

The present application claims priority to Russian Patent Application No. 2022107038, filed on Mar. 17, 2022, the entire content of which is incorporated herein by reference.

FIELD OF TECHNOLOGY

The present disclosure relates to the field of data security, more specifically to systems and methods for detecting harmful scripts.

BACKGROUND

The number of users and corporations and the variety of their aims and activities is constantly increasing. There is a simultaneous increase in the number of websites and webpages being created.

The creation of a webpage, the simplest tool for accessing information on the internet, requires the use of the resources of a computer system. These resources are most commonly used with the aid of script programming languages (PHP, JavaScript, Python, Ruby and others).

A script (or a scenario) refers to a program code written in various interpretable programming languages. All scripts are executed with the aid of an external interpreter program. Unlike executable files, most scripts exist in the form of text files and can be read by humans. Harmful scripts are conventionally divided into two types. The first type of harmful scripts includes scripts that are embedded in webpage codes. This types of harmful codes are interpreted by a browser and execute actions inserted by malicious parties. The second type of harmful scripts includes scripts that are designed to be launched on a user's computer. These second type of harmful scripts are executed by components of the operating system and can access an API (file system, processes, etc.).

There are many methods of detecting harmful scripts. One method is to analyze the text of webpage files in detail. The known approaches may achieve partial detection of harmful scripts, but cannot effectively resolve the problem of detecting truncated and partially damaged harmful scripts transmitted by methods other than that of embedding in a webpage.

Therefore, there is a need for a method and a system for detection of harmful scripts.

SUMMARY

Aspects of the disclosure relate to for detecting harmful scripts based on a set of hash codes.

In one exemplary aspect, a method is provided for detecting harmful scripts based on a set of hash codes, the method comprising: identifying a file containing a script, wherein the identification of the file is performed by analyzing each file of a plurality of files for a presence of a harmful script, generating a summary of the script based on the identified file, calculating static and dynamic parameters of the generated summary of the script, recognizing a script programming language based on the calculated static parameters and dynamic parameters of the generated summary of the script using at least one language recognition rule, processing the identified file based on the data about the recognized script programming language, generating a set of hash codes based on a processed file using rules for generating hash codes, and detecting the harmful script when the generated set of hash codes is similar to known harmful sets of hash codes.

In one aspect, the analysis for each file of a plurality of files for a presence of a harmful script is performed using heuristic algorithms created for: searching for structured types of files in which the presence of harmful scripts is unlikely, and excluding the structured types of files that are found from said plurality of files.

In one aspect, the summary of the script is generated by isolating a set of significant bytes and a set of excluded bytes from the identified file.

In one aspect, the set of significant bytes is isolated from the identified file by filtering the identified file using at least one filter algorithm.

In one aspect, the set of excluded bytes is obtained by removing the set of significant bytes from the identified file.

In one aspect, the at least one language recognition rule includes a set of results of operations of at least one decision tree, where a presence of a result of the at least one decision tree is used to indicate that a script written in a specific programming language has been detected.

In one aspect, the processing of the identified file comprises: removing all symbols, except visible symbols, from the ASCII table, line break and space symbols and symbols from the Unicode table; removing lines containing comments and individual tagged lines characteristic of the recognized programming language; converting the text to lowercase; and indicating a start and an end of line constant characteristic of the recognized programming language.

In one aspect, the set of hash codes is generated by: dividing the processed file into constructions containing a combination of symbols with a length of four to ten symbols; calculating a number of occurrences of all detected constructions in the processed file; determining a type of hash code used using hash code generation rules; and generating the set of hash codes from hash codes of a specified type.

In one aspect, the hash code generation rules include a set of conditions, wherein, when the set of conditions is satisfied, a specified type of hash code is used.

In one aspect, the static parameters of the generated summary of the script include at least one of: a list of characteristics calculated based on a set of significant bytes and a number of occurrences of comments, lines containing symbolic expressions, and constructions containing expressions of known script programming languages.

In one aspect, the dynamic parameters of the generated summary of the script include at least a list of characteristics calculated based on a number of occurrences of each type of construction containing a combination of symbols characteristic of each programming language in a set of significant bytes.

According to one aspect of the disclosure, a system is provided for detecting harmful scripts based on a set of hash codes, the system comprising a hardware processor configured to: identify a file containing a script, wherein the identification of the file is performed by analyzing each file of a plurality of files for a presence of a harmful script, generate a summary of the script based on the identified file, calculate static and dynamic parameters of the generated summary of the script, recognize a script programming language based on the calculated static parameters and dynamic parameters of the generated summary of the script using at least one language recognition rule, process the identified file based on the data about the recognized script programming language, generate a set of hash codes based on a processed file using rules for generating hash codes, and detect the harmful script when the generated set of hash codes is similar to known harmful sets of hash codes.

In one exemplary aspect, a non-transitory computer-readable medium is provided storing a set of instructions thereon for detecting harmful scripts based on a set of hash codes, wherein the set of instructions comprises instructions for: identifying a file containing a script, wherein the identification of the file is performed by analyzing each file of a plurality of files for a presence of a harmful script, generating a summary of the script based on the identified file, calculating static and dynamic parameters of the generated summary of the script, recognizing a script programming language based on the calculated static parameters and dynamic parameters of the generated summary of the script using at least one language recognition rule, processing the identified file based on the data about the recognized script programming language, generating a set of hash codes based on a processed file using rules for generating hash codes, and detecting the harmful script when the generated set of hash codes is similar to known harmful sets of hash codes.

The method and system of the present disclosure are designed to identify harmful scripts or parts thereof written in a specific programming language, by detecting a file containing a script, recognizing the script language using language recognition rules, generating a set of hash codes of the detected script, and comparing the set of hash codes of the script with known sets of hash codes of harmful scripts to identify the harmful scripts.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for detecting harmful scripts based on a set of hash codes in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

The following terminologies and concepts are provided in order to clearly present the aspects of the present disclosure.

A hash function refers to an algorithm that converts a line of any length (a message) into a bitmapped line of fixed length, called a hash code, a checksum or a digital fingerprint. Many security technologies use non-reversible encryption functions, also called hash functions. The main purpose of these functions is to extract from a message of arbitrary length its hash code, which is a value of fixed size. A hash code may be used as a checksum for the original message, thus enabling the integrity of the information to be checked (if a corresponding protocol is used).

A script (or a scenario) is a program (a special form of program code), usually written in a particular interpretable (not compiler-based) language and containing individual commands or instructions. For example, a script is incorporated in the text of a webpage in the form of the original code and is interpreted by a system installed on the computer of a remote user who has requested this page.

A Java script is written in a form of a text in the Java programming language, incorporated directly in a webpage and loaded together with it. It is executed by a Java interpreter that is built into almost all modern browsers.

Malicious parties use the capacity of scripts to call the resources of a computer system for harmful purposes. Existing data transmission methods make it possible to mask a script in any kind of file and to compel the user, by one method or another, to activate it. In order to detect a script in a known script programming language, or a part thereof, a system for detecting harmful script on the basis of a set of hash codes is used.

Figure 1:
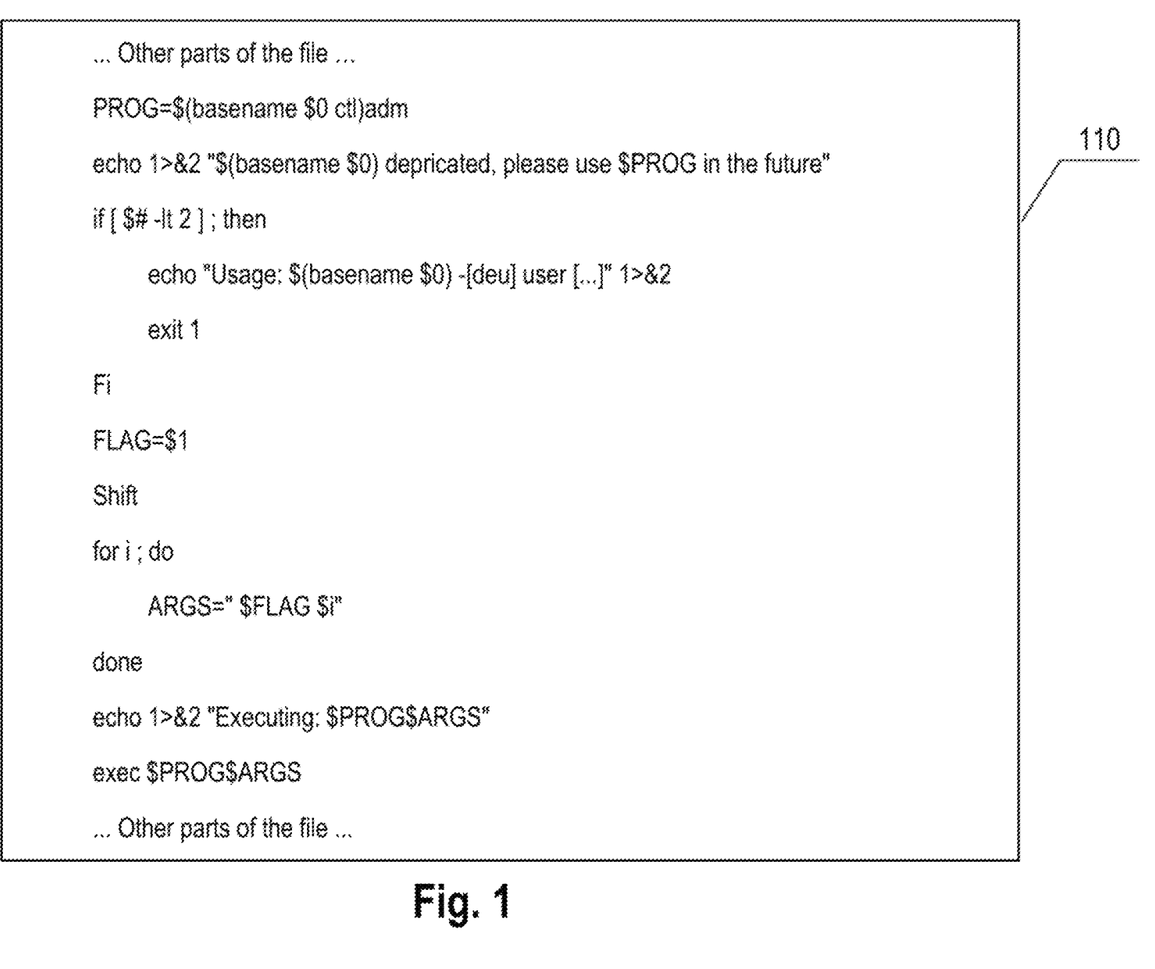
FIG. 1 illustrates an example of a file containing the source code of a script.

FIG. 1 illustrates an example of a file containing the source code of a script. The file containing the script 1 is written in the Bash programming language 110. The scripts of a Bash command line are sets of commands for a Linux command line collected in files and united by a common purpose. The sets of commands for a Linux command line can be entered from a keyboard. The results of the operation of the commands may either have an independent value or may act as input data for other commands and files.

Figure 2:
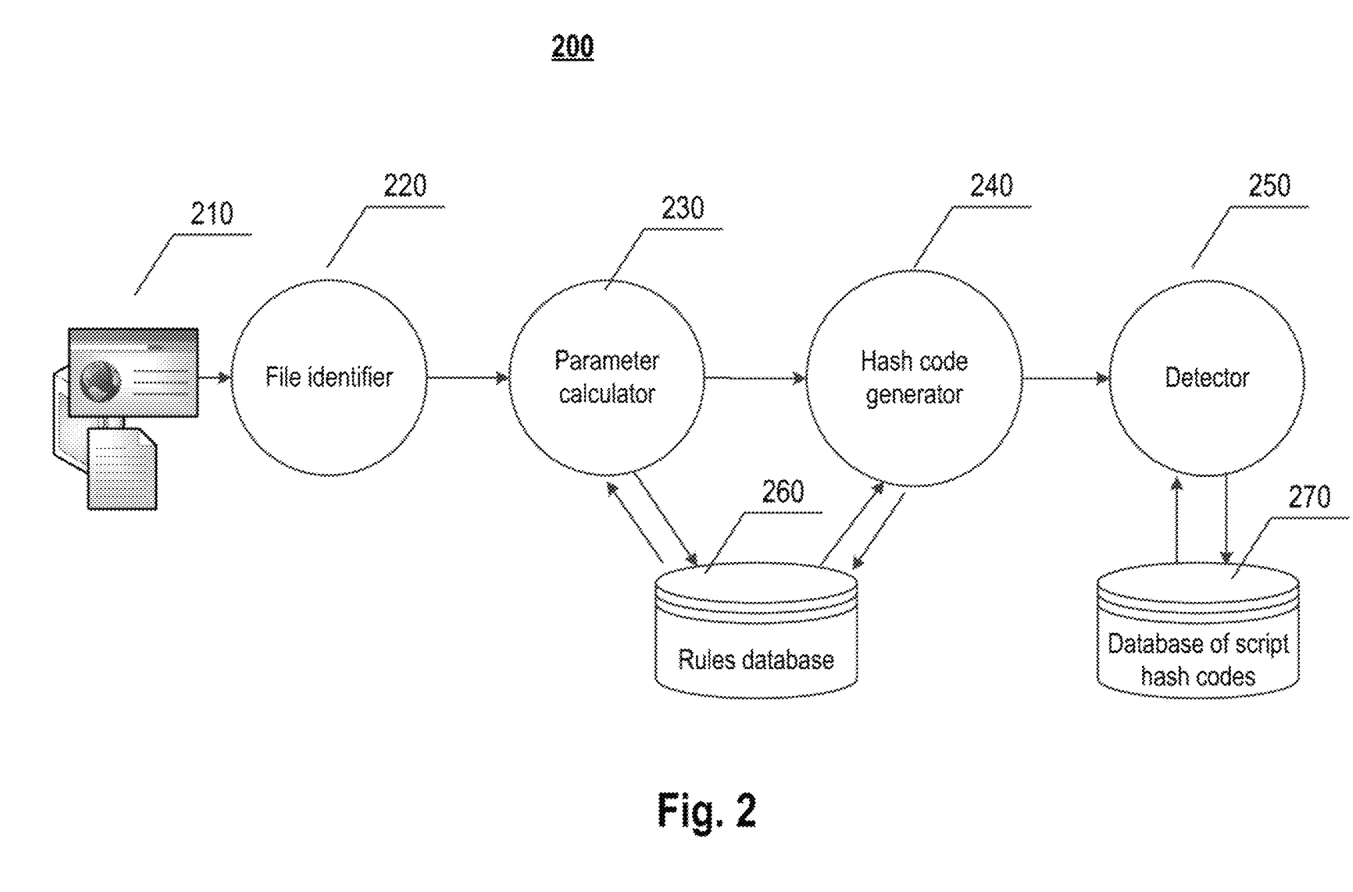
FIG. 2 illustrates a block diagram of an exemplary system for detecting harmful scripts based on a set of hash codes in accordance with aspects of the present disclosure.

FIG. 2 illustrates a block diagram of an exemplary system 200 for detecting harmful scripts based on a set of hash codes in accordance with aspects of the present disclosure. In one aspect, the system 200 comprises: a file identifier 220, a parameter calculator 230, a hash code generator 240, a detector 250, a rules database 260, and database of script hash codes 270.

Figure 4:
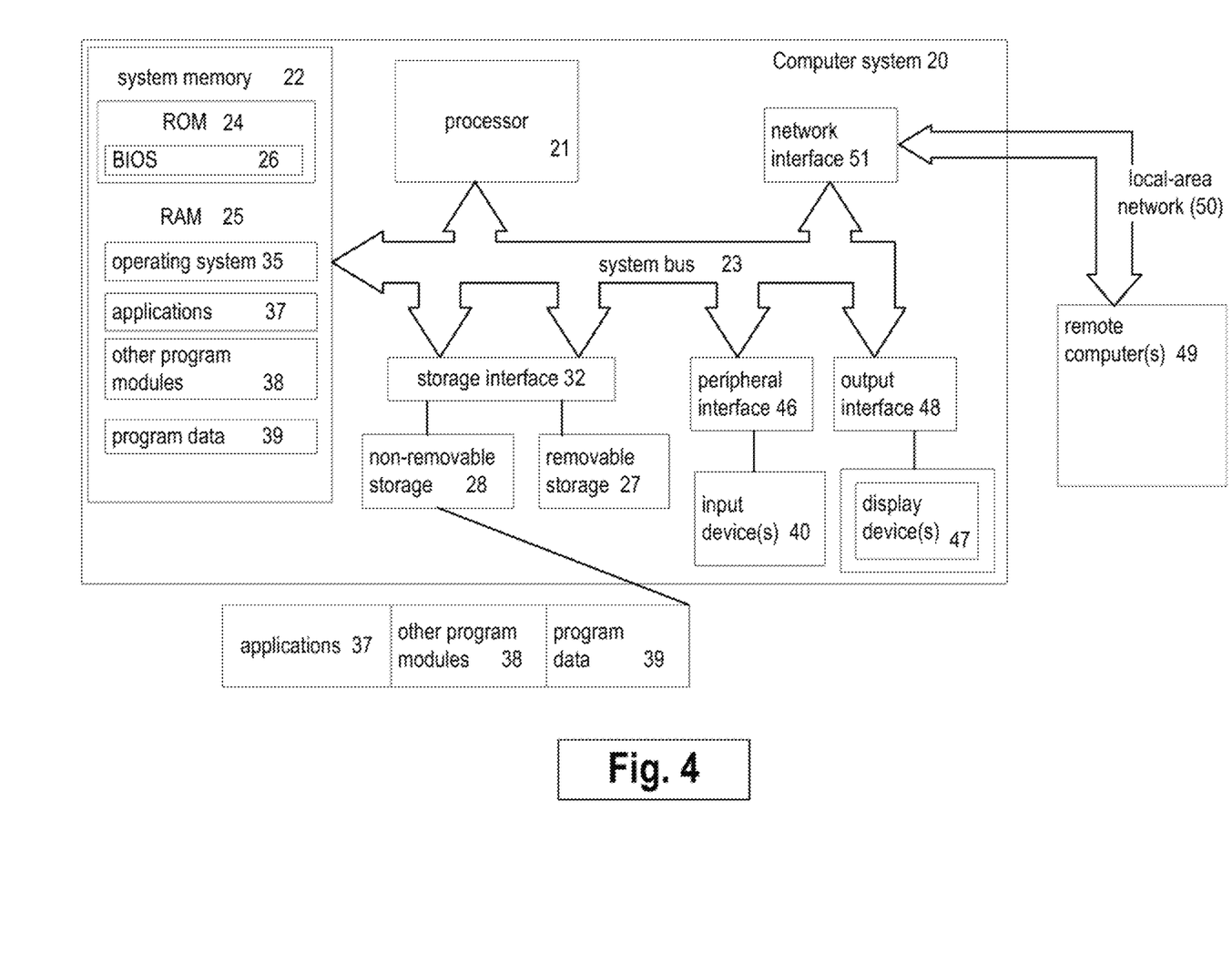
FIG. 4 presents an example of a general purpose computer system on which aspects of the present disclosure can be implemented.

In one aspect, the system 200 is implemented via a general purpose computer, as shown in FIG. 4, including a hardware processor and memory. The system 200 may comprise functional and/or hardware modules and the file identifier 220, the parameter calculator 230, the hash code generator 240, the detector 250, the rules database 260, and the database of script hash codes 270, which in turn comprise instructions for execution on the hardware processor.

The various aspects of the file identifier 220, the parameter calculator 230, the hash code generator 240, the detector 250, the rules database 260, and the database of script hash codes 270 are described below.

In one aspect, the file identifier 220 is designed to identify a file containing a script. The file identifier 220 identifies a file containing a script, by analyzing each file from a plurality of files 210 in which it is necessary to check for a presence of a harmful code. The plurality of files 210 may comprise various files with which the user has interacted, in one or another form. The plurality of files 210 may include website and webpage files, electronic message files, and others. The analysis is carried out using heuristic algorithms created for searching for structured file types in which the presence of scripts is unlikely (for example, executable files in PE/ELF/MACHO format, archives, individual types of document files, etc.). Said found files are excluded from the plurality of files 210 which have to be checked for the presence of harmful code. The files remaining after this exclusion are considered to be files that may contain a harmful code.

The file identifier 220 is also designed to generate a summary of the script based on the identified file, and to transmit data about the identified file and data about the generated summary of the script to the parameter calculator 230.

In one aspect, by the file identifier 220, the summary of the script is generated by: isolating a set of significant bytes and a set of excluded bytes from the identified file, analyzing the isolated sets, and creating the summary of the script based on the results of the analysis.

In one aspect, the set of significant bytes is isolated from the identified file by filtering the identified file using one or more filter algorithms.

In one aspect, the filter algorithms take one or more of the following actions:
  identifying parts of the identified file that hypothetically contains a script;
  removing all symbols, except visible symbols from the ASCII table;
  removing line break and space symbols and symbols from the Unicode table;
  converting the text to lowercase;
  removing lines containing comments in popular script programming languages;
  removing lines containing the expression "any text $ any text and punctuation mark"; and
  removing lines containing continuous expressions (without spaces, line breaks, punctuation marks) with a length exceeding a threshold value for lengths of symbols, wherein the threshold value for the lengths of symbols is an adjustable parameter.

In one aspect, the set of excluded bytes is obtained by removing the set of significant bytes from the identified file.

In one aspect, the summary of the script comprises a data structure calculated based on parameters of the identified file, which characterize the script contained in the file.

In one aspect, the summary of the script contains at least one of the following:
  a set of significant bytes;
  a set of excluded bytes;
  a number of bytes in the form of comments in each pattern from the set of excluded bytes;
  a size of a block occupied by the set of significant bytes;
  a number of lines containing at least one significant byte;
  a number of lines containing the expression "[any text (set of one or more arbitrary symbols)]" or part thereof;
  a number of lines containing the expression "any text=any text" or part thereof;
  a number of lines containing the expression "$=any text" or part thereof;
  a number of constructions containing the expression "if any text—fi any text" or part thereof;
  a number of constructions containing the expression "any text do any text" or part thereof;
  a number of constructions containing the expression "any text case—esac any text" or part thereof;
  a number of constructions containing the expression "if any text—fi any text" or part thereof;
  a number of constructions containing the expression "def any text" or part thereof;
  a number of constructions containing the expression "use any text" or part thereof;
  a number of constructions containing the expression "any number: any number" or part thereof;
  a number of lines beginning with a symbol from the Latin alphabet;
  a number of lines containing only one ":"symbol among all the symbols in the line;
  a number of lines in which the last symbol is the symbol "\";
  a number of lines in which the last symbol is the symbol ":";
  a number of lines in which the last symbol is the symbol ";";
  a total number of lines;
  a number of significant lines;
  a number of bytes from the file examined; and
  a presence of a set of shebang symbols "#!/bin/bash".

In one aspect, the data about the identified file include the file itself and the data obtained as a result of its analysis.

In one aspect, the parameter calculator 230 is designed to calculate static and dynamic parameters of the generated summary of the script.

In one aspect, the static parameters of the generated summary of the script include the following list of characteristics:
  an entropy of a block occupied by the set of significant bytes;
  a number of occurrences of each significant byte of the possible significant bytes in a block occupied by a set of significant bytes, divided by a total number of significant bytes and multiplied by 1024;
  a number of excluded comments of each type, divided by a total number of excluded comments and multiplied by 1024;
  a presence of a set of shebang symbols: 512 if yes, 0 otherwise;
  a number of lines containing the expression "[any text]" or part thereof, divided by the number of significant lines and multiplied by 1024;
  a number of lines containing the expression "[any text=any text]" or part thereof, divided by the number of significant lines and multiplied by 1024;
  a number of lines containing the expression "[$=any text]" or part thereof, divided by the number of significant lines and multiplied by 1024;
  a number of constructions containing the expression "if any text—fi any text" or part thereof, divided by the number of significant lines and multiplied by 1024;
  a number of constructions containing the expression "any text do any text" or part thereof, divided by the number of significant lines and multiplied by 1024;
  a number of constructions containing the expression "any text case—esac any text" or part thereof, divided by the number of significant lines and multiplied by 1024;
  a number of constructions containing the expression "var any text" or part thereof, divided by the number of significant lines and multiplied by 1024;
  a number of constructions containing the expression "def any text" or part thereof, divided by the number of significant lines and multiplied by 1024;
  a number of constructions containing the expression "use any text" or part thereof, divided by the number of significant lines and multiplied by 1024;
  a number of constructions containing the expression "any number: any number" or part thereof, divided by the number of significant lines and multiplied by 1024;

a number of lines beginning with a symbol from the Latin alphabet, divided by the number of significant lines and multiplied by 1024;

a number of lines containing only one ":"symbol among all the symbols in the line, divided by the number of significant lines and multiplied by 1024;

a number of lines in which the last symbol is the symbol "\";

a number of lines in which the last symbol is the symbol "\", divided by the number of significant lines and multiplied by 1024;

a number of lines in which the last symbol is the symbol ":", divided by the number of significant lines and multiplied by 1024;

a number of lines in which the last symbol is the symbol ";", divided by the number of significant lines and multiplied by 1024; and a number of lines beginning with symbols from the Latin alphabet, divided by the number of significant lines and multiplied by 1024.

In one aspect, the dynamic parameters of the generated summary of the script include a number of occurrences of each type of construction containing a combination of symbols characteristic of each programming language in the set of significant bytes, divided by the total number of occurrences of all constructions and multiplied by 1024.

For the Bash language, for example, the number of occurrences in the set of significant bytes of constructions containing a combination of symbols may be calculated from the following dynamic list of combinations of symbols: my$; $$; "${; $!; $?; $x; $ #; $*; $@; $-; $_; $(; $0; $1; $2; $3; ./; ==; !=; <=; >=; =~; --; +r; +w; +x; -a; -b; -c; -e; -f; -g; -h; -i; -j; -k; -l; -m; -n; -o; -p; -q; -r; -s; -t; -u; -v; -w; -x; -y; -z; >>; <<; /bin; /boot; /dev; /etc; /opt; /X11; /sgml; /xml; /home; /lib; /media; /mnt; /opt; /proc; /root; /run; /sbin; /srv; /sys; /tmp; /usr; /bin; /include; /lib; /local; /sbin; /share; /src; /var; /cache; /lib; /lock; /log; /mail; /run; /spool; /mail; /tmp; breaksw; endsw; *); if; fi; then; else; elif; case; esac; [[;]]; true; false; do; done; while; for; until; break; continue; select; function; if["$; if[$; if("$; if($; if[-d; if]!-d; if[-f; if[!-f; iftest;;then; case"$; echo$; echo"$; sed-; grep-; ne-; while[$;]do; whileread; test; apt; zypp; dnf; dig; chown; sync; chsh; chattr; puts; rm-; rm*; rpm; fold; rmdir; less; more; readelf; mv; pg_dump; popd; last; @echooff; @echoon; echooff; echoon; scp; pwd; logout; find; lsof; uuencode; yum; cat; clear; xmllint; stat; ssh-copy-i; Prints; printf; host; chmod; split; xxd; top; cd; od; sed; bind; whoami; ionice; touch; screen; diff; set; dirname; ifconfig; uniq; uname; cpio; eval; brew; awk; which; shopt; pkg; pdfunite; bunzip2; watch; ifconfig; bzip2; join; exec; . . . ; seq; xhost; bash; unalias; env; comm; node; ping; file; zcat; cowsay; tac; unzip; which; netstat; pstree; readlink; getent; lspci; /bin/sh; apropos; ssh; cd$; bar; ant; ipcs; ldd; vagrant; tail; .sh; tar; hostname; setarch; mate; kill; cut; alias; nohup; trap; chgrp; grep; wget; lshw; rev; locate; shred; sshpass; make; ssh-keygen; nslookup; tee; mktemp; shift; objdump; gunzip; mount; cron; stdbuf; pushd; groups; qstat; xargs; tmux; sudo; mkdir; strace; timex; mvn; tree; eof; eod; exit$; /dev/null; expect; ../; pkill; 2>&1; install; gcc; python; perl; java; .so; "$@"; http; →; class; module; import; def; std::; var; function; usestrict; export; default; jquery; const; from; namespace; public; private; protected; interface; use-warnind; uselib; foreach; my$; eval; =>; package; sub; usevars; useparent; $self; <-; body{; typedef; @shift; win-dow; microsoft; font; PHONY; CMAKE_; PROJECT_; CTEST_; CPACK_; gem::; gem"; gemspec; docker; ENTRYPOINT; post; host:; user-agent; Accept:; DNT:; Content-Ty; Content-Le; Disass; PUSHBUTTON; COMBOBOX; LTEXT; CONTROL; EDITTEXT; EDITTEXT; IDS_; DS_; WS_; IDD_; <tr><td.

In one aspect, the combinations of symbols characteristic of a given language are revised using machine learning and mathematical statistics. Firstly, the key words, expressions, and names or parts of names of functions, classes and variables from popular libraries of a given programming language are examined. Then, the occurrences are calculated by calculating the values of a rolling hash function for the set of significant bytes. A byte sequence of 10 bytes is optimal in terms of complexity and speed of calculation. Said hash code is calculated, starting with the first byte of the byte sequence. There is then a shift of one byte and said hash code is re-calculated from the second byte of the byte sequence. This action is then repeated for the whole set of significant bytes. The number of occurrences of the hash codes from said constructions is then calculated, with an accuracy such that they fall within the Bloom probability number.

In one aspect, the parameter calculator 230 is also designed to recognize a script programming language based on the calculated parameters of the generated summary of the script, using language recognition rules obtained from the rules database 260, and to transfer data about the identified file, data about the generated summary of the script, and data about the recognized script programming language to the hash code generator 240.

In one aspect, the script programming language is recognized with the aid of machine learning methods. The calculated parameters are used as characteristics that are sent to the input of pre-trained machine learning models in the form of decision trees.

In one aspect, the machine learning model uses five decision tree patterns for confirming the programming language. For each programming language, a set of characteristics is generated and used for training the decision trees. As a result of the training, five decision trees are generated for one language. The result of the operation of each tree is either a confirmation or a non-confirmation of whether the examined script is written in the current programming language. A final conclusion for confirming the current programming language may be drawn from the results of the operation of all five decision trees.

In one aspect, in addition to the sets of trees for confirming the script programming language, decision trees may also be created for confirming alternative languages, such as a configuration file language (in-file) or a PostScript programming language (pdf-file). These additional decision trees may be used to reduce false positives.

A language recognition rule includes a set of results of the operation of all the programming language confirmation decision trees for the recognition of all languages. The presence of a result confirming to the language recognition rule is used to detect a script that is written in a specific programming language.

An example of a language recognition rule is the following set of results of the operation of decision trees:

a minimum of three out of five decision trees for confirming one programming language have yielded a positive result; and the decision trees for confirming other languages have yielded not more than two positive results for any language.

When said set of conditions are satisfied, it is considered that the detected script is written in the programming language for the recognition of which three out of five decision trees have yielded a positive result.

Another example of a language recognition rule is the following set of results of the operation of decision trees:
- a minimum of three out of five decision trees for confirming one programming language have yielded a positive result;
- the decision trees for confirming other languages have yielded not more than two positive results for any language; and
- a minimum of four out of five decision trees for confirming an alternative language have given a positive result.

When said set of conditions are satisfied, it is considered that the detected script is written in the alternative language, for the recognition of which four out of five decision trees have yielded a positive result.

Another example of a recognition rule is the following set of results of the operation of decision trees:
- a minimum of three out of five decision trees for confirming one language have yielded a positive result; and
- a minimum of three out of five decision trees for recognizing another language have yielded a positive result.

When said set of conditions are satisfied, it is considered that a further decision tree must be used to refine the result of the decision trees that have yielded a positive result.

In one aspect, the hash code generator 240 is designed to process the identified file based on the data about the recognized programming language, thus converting the identified file into a specific form.

In one aspect, the hash code generator 240 processes the identified file by:
- removing all the symbols, except visible symbols from the ASCII table; line break and space symbols and symbols from the Unicode table; lines containing comments and individual tagged lines characteristic of the recognized programming language;
- converting the text to lowercase; and indicating the start and end of line constants characteristic of the recognized programming language.

In one aspect, the hash code generator 240 is also designed to: generate a set of hash codes based on the processed file, use the rules for generating hash codes from the rules database 260; and transmit the generated set of hash codes to the detector 250.

In one aspect, the hash code generator 240 generates the set of hash codes by executing the following list of actions:
1) dividing the processed file into constructions containing a combination of symbols with a length of 4 to 10 symbols;
2) calculating the number of occurrences of all the detected constructions containing a combination of symbols with a length of 4 to 10 symbols in the processed file; for example, if the processed file is represented in the form of the symbols "colacola", then the division into constructions results in the following block: {cola: 2, colacola: 1, olacola: 1, lacola: 1, acola: 1, colac: 1, colaco: 1, colacol: 1};
3) determining the type of hash code used, with the aid of the hash code generation rules; and
4) generating a set of hash codes from the hash codes of a specified type.

In one aspect, the number of occurrences of each type of construction, from all the programming languages, containing a combination of symbols with a length of 4 to 10 symbols, in the processed file is calculated by calculating the rolling hash function formed from the parts of the file, in the form of a byte sequence with a size of 10 bytes, where the number of symbols in the combination of symbols has a length of 4 to 10 symbol. Then, the number of occurrences of the hash codes from said constructions is calculated with an accuracy such that they fall within the Bloom probability number (the size of which coincides with the size of the Bloom probability number used in the language recognition step).

In one aspect, the rule for generating hash codes includes a set of conditions. For example, based on whether or not the rules for generating hash codes are satisfied, a first given hash code or a second given hash code may be used.

In one aspect, the creation of hash code generation rules is mainly based on the calculated number of occurrences. An example of a rule for generating hash codes is the case where the number of occurrences is less than a threshold value. If this set of conditions is satisfied, when the set of hash codes is generated, an abbreviated type of hash code (described below) is used. Another example of a rule for generating hash codes is the case where the number of occurrences is equal to or greater than a threshold value. If this set of conditions is satisfied, a full-size type of hash code (described below) is used when the set of hash codes is generated. The threshold value of the number of occurrences may be determined statistically or empirically, or may be specified by an expert. In one aspect, the threshold value of the number of occurrences is established as a result of the operation of machine learning algorithms.

In one aspect, the abbreviated type of hash code includes a 64-bit value obtained from a combination of two halves of the 128-bit MurmurHash3 hash function from the processed file. In one aspect, the full-size type of hash code includes a type of hash code that is calculated from the pair "hash code from a combination of symbols/number of occurrences of said hash code in the step of processing an identified file in the calculation of rolling hash codes", using the murmur 3, xor and cosine distance algorithm for calculating hash functions. If there are some pairs with different hash codes but the same number of occurrences, then it is possible to use only one of these pairs to calculate a full-size hash code.

In one aspect, the detector 250 is designed to detect harmful script by comparing the generated set of hash codes with known harmful sets of hash codes obtained from the database of script hash codes 270. The comparison is preferably conducted by using locally sensitive hash function algorithms and detecting the minimum cosine distance. If the generated set of hash codes is similar to known harmful sets of hash codes, the script is recognized as containing harmful code.

In one aspect, the rules database 260 is designed to store language recognition rules and hash code generation rules. In one aspect, the database of script hash codes 270 is designed to store known hash codes and sets of hash codes of known scripts, including harmful scripts. Various types of database may be used as the rules database 260 and the database of script hash codes 270, namely: hierarchical databases (IMS, TDMS, System 2000), network databases (Cerebrum, Cronospro, DBVist), relational databases (DB2, Informix, Microsoft SQL Server), object-oriented databases (Jasmine, Versant, POET), object-relational databases (Oracle Database, PostgreSQL, FirstSQL/J), functional databases, and others. In one aspect, the rules may be created using machine learning algorithms and automated processing of large data sets.

For ease of understanding, aspects of the present disclosure are illustrated below in a simplified form.

For a script 1 from the file 110, the set of significant bytes may look like the following:

prog=$(basename$0ctl)admecho1>&2"$(basename$0) depricated,pleaseuse$proginthefut ure"if[$ #-lt2];thenecho"usage:$(basename$0)-[deu]user [ . . ]"1>&2exit1fiflag=$1shiftfori; doargs="$flag$i"doneecho1>&2"executing:$p rog$a- rgs"exec$prog$args For a script 1, the summary of the script may look like the following:

```
{
    commentsCount = {0, 0, 0, 0, 0, 0, 0, 0, 0};
    cleanBytes = "
prog=$(basename$0ctl)admecho1>&2"$(basename$0)depricated,pleaseuse$proginthefut
ure"if[$#-lt2];thenecho"usage:$(basename$0)-
[deu]user[...]"1>&2exit1fiflag=$1shiftfori;doargs="$flag$i"doneecho1>&2"executing:$p
rog$args"exec$prog$args";
    cleanBytesCount = 230;
    significantLinesCount = 13;
    linesCount = 13;
    iniSectionsCount = 0;
    assignmentsCount = 3;
    psAssignmentsCount = 0;
    ifFiCount = 1;
    bashCycleCount = 1;
    caseEsacCount = 0;
    varCount = 0;
    defCount = 0;
    useCount = 0;
    timestampCount = 0;
    bytesRawRead = 293;
    linesStartedWithLetterCount = 13;
    singleColonInLine = 2;
    lastSlashCount = 0;
    lastColonCount = 0;
    lastSemicolonCount = 0;
    hasShebang = false;
}
```

The full set of characteristics of the script 1, transmitted to the machine learning model for recognition of the Bash programming language may then be:

[4919, 0, 35, 4, 66, 0, 13, 0, 13, 13, 0, 0, 4, 8, 13, 0, 13, 22, 17, 0, 0, 0, 0, 0, 0, 0, 8, 8, 0, 13, 13, 0, 0, 13, 0, 13, 0, 0, 0, 66, 13, 31, 26, 115, 31, 48, 26, 40, 0, 0, 22, 17, 31, 44, 26, 0, 48, 48, 40, 31, 0, 0, 13, 0, 0, 0, 0, 0, 0, 0, 0, 0, 0, 0, 0, 0, 0, 0, 236, 0, 78, 78, 0, 0, 0, 0, 0, 1024, 157, 0, 0, 0, 0, 0, 0, 8, 0, 0, 0, 0, 0, 0, 8, 16, 0, 8, 0, 0, 0, 0, 0, 0, 0, 0, 0, 8, 0, 0, 0, 0, 0, 0, 0, 0, 8, 8, 0, 0, 0, 0, 16, 0, 0, 8, 8, 8, 0, 0, 0, 0, 0, 0, 8, 0, 8, 8, 8, 16, 24, 8, 0, 24, 8, 0, 0, 0, 0, 0, 0, 8, 0, 8, 0, 0, 0, 0, 8, 0, 8, 0, 0, 0, 8, 0, 0, 0, 16, 0, 8, 0, 0, 0, 0, 0, 16, 0, 0, 0, 0, 0, 0, 8, 0, 8, 0, 8, 0, 0, 0, 0, 0, 8, 0, 0, 0, 0, 0, 0, 0, 0, 8, 8, 0, 0, 0, 0, 8, 0, 0, 0, 8, 0, 8, 8, 0, 0, 0, 0, 0, 0, 8, 0, 16, 0, 0, 0, 0, 0, 0, 8, 0, 0, 0, 0, 0, 0, 0, 0, 0, 0, 0, 8, 0, 8, 0, 0, 0, 0, 0, 0, 0, 0, 0, 0, 0, 8, 0, 8, 0, 0, 0, 0, 16, 0, 0, 0, 8, 0, 0, 0, 0, 16, 0, 0, 0, 8, 0, 8, 0, 0, 0, 0, 0, 0, 0, 8, 8, 16, 8, 0, 0, 0, 24, 8, 0, 16, 0, 0, 0, 8, 0, 0, 0, 0, 8, 0, 0, 0, 0, 8, 16, 8, 0, 0, 0, 8, 0, 0, 0, 0, 0, 8, 0, 0, 0, 8, 0, 0, 0, 0, 0, 0, 0, 0, 16, 0, 0, 0, 0, 0, 0, 16, 8, 0, 0, 0, 0, 0, 0, 8, 0, 8, 8, 0, 16, 8, 0, 8, 0, 0, 8, 8, 0, 8, 8, 8, 0, 0, 0, 0, 8, 0, 0, 0, 8, 24, 0, 0, 0, 0, 0, 8, 8, 16, 0, 8, 8, 0, 0, 0, 0, 16, 0, 0, 8, 0, 0, 8, 0, 0, 0, 8, 0, 0, 8, 0, 0, 8, 0, 0, 8, 0, 0, 24, 8, 8, 0, 0, 0, 8, 8, 0, 8, 8, 0, 0, 0, 0, 0, 0, 0, 0,].

All five decision trees for confirming the Bash language have yielded a positive result. Example of implementation of one of the trees: def dt_code(features_original):
    features=[0]+[feature*2 for feature in features_original]
    if features[76]<=3: #CommentStyle.POWERSHELL_MULTILINE_COMMENT
    if features[81]<=178: #has_shebang
    if features[79]<=25: #assignment_share
    if features[31]<=0: #>
    if features[81]<=50: #has_shebang
    if features[357]<=39: #-reference
    if features[14]<=6: #-
    if features[68]<=94: #}
    if features[400]<=72: #break
    if features[14]<=1: #-
    if features[382]<=61: #$psculture
    if features[49]<=73: #j
    if features[424]<=272: #$($
    if features[61]<=250: #v
    if features[387]<=36: #[system.
    if features[256]<=128: #param
    if features[420]<=82: #.ps
    if features[269]<=49: #]$
    if features[12]<=149: #+
    if features[297]<=298: #format-
    if features[324]<=163: #able-
    if features[65]<=106: #z
    if features[367]<=137: #ext.encodi
    if features[5]<=10: #$
    if features[216]<=59: #-type
    if features[244]<=151: #byte[ ]
    if features[58]<=201: #s
    if features[367]<=110: #ext.encodi
    if features[233]<=120: #select-
    if features[212]<=67: #@(
    if features[362]<=155: #-it
    if features[37]<=71: #
    if features[420]<=38: #.ps
    if features[315]<=21: #-not
    if features[16]<=185: #/
    if features[141]<=74: #elseif
    if features[245]<=103: #ynamicpara
    if features[178]<=100: #-xor
    if features[43]<=205: #d
    if features[162]<=107: #-bnot
    if features[319]<=33: #-path
    if features[92]<=926: #last_colon_count

```
if features[221]<=72: #iex
if features[95]<=4: #-bxor$
if features[1]<=5176: #entropy
if features[209]<=42: #>>
if features[339]<=60: #-as
if features[219]<=31: #@{
if features[293]<=158: #in
if features[18]<=211: #1
if features[376]<=7: #register-
if features[251]<=5: #-error
return [22482, 0]
else: #if features[251]>5 #-error
if features[286]<=71: #[intptr]
if features[145]<=29: #-and$
if features[377]<=30: #-in$
if features[320]<=19: #-match
return [2700, 0] . . .
```

All the other trees yielded a negative result. The rule was applied and the identified file was thus recognized as a script in the Bash language. The processed file is then generated, followed by a set of hash codes:

prog=$(basename$0ctl)admecho1>&2"$(basename$0) depricated,pleaseuse$proginthefut ure"if[$echo "usage:$(basename$0)-[deu]user
[ . . . ]"1>&2exit1fiflag=$1shiftfori: doargs="$flag$i"doneecho1>&2"executing:$p rog$args"exec$prog$args.

A full-size hash code cannot be constructed, since the rule has not been applied, and only two (hash-occurrence) pairs are found: (830, 4), (69, 3). Hash codes of an abbreviated type will therefore be calculated. Since the size of the processed file is insignificant, there will be one hash code, equal to 0xd43903d3f56d64c1.

Figure 3:
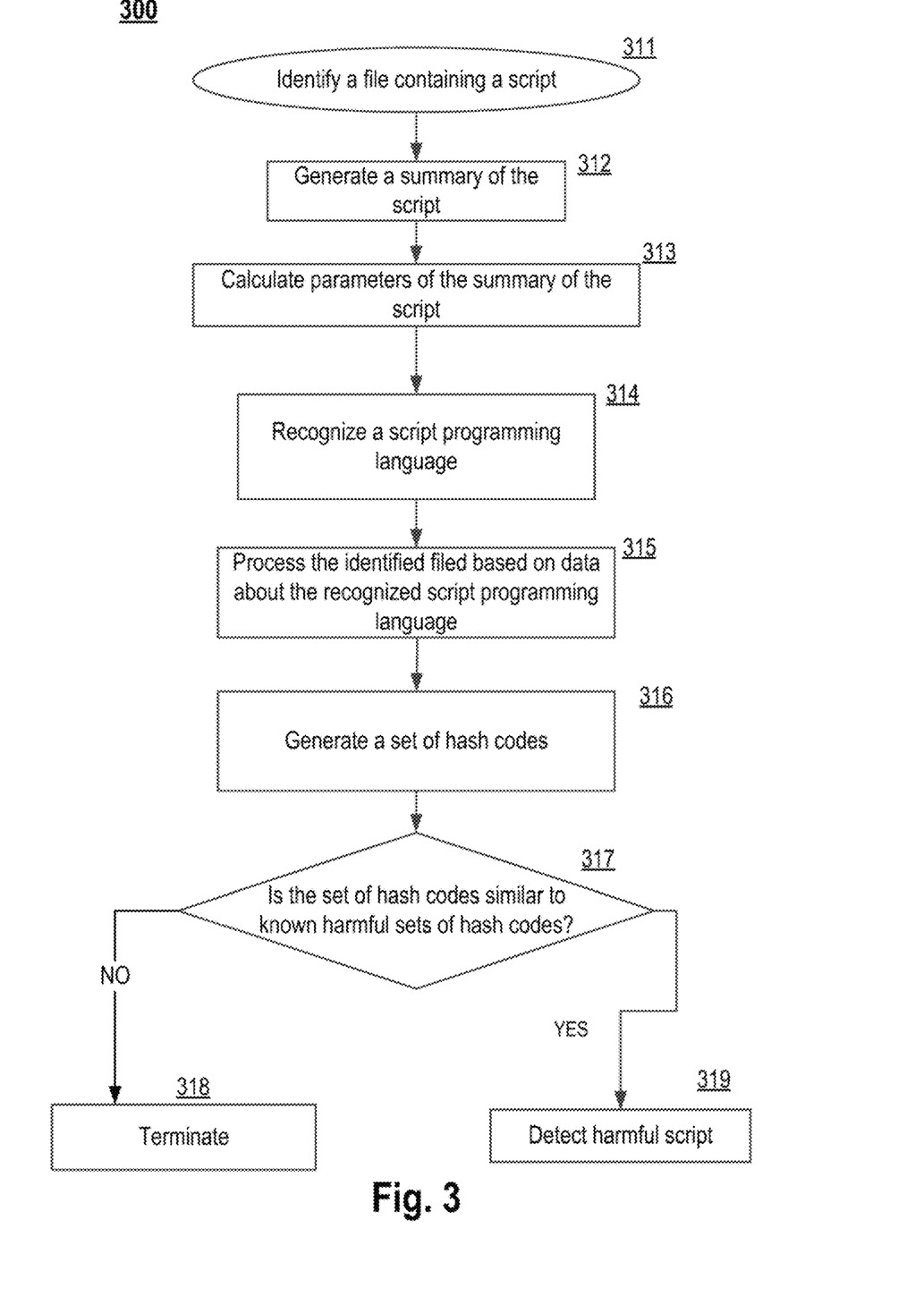
FIG. 3 illustrates a method for detecting harmful scripts based on a set of hash codes in accordance with aspects of the present disclosure.

FIG. 3 illustrates a method 300 for detecting harmful scripts based on a set of hash codes in accordance with aspects of the present disclosure.

In step 311, by a file identifier 220, method 300 identifies a file containing a script, wherein the identification of the file is performed by analyzing each file of a plurality of files for a presence of a harmful script.

In one aspect, the analysis for each file of a plurality of files for a presence of a harmful script is performed using heuristic algorithms created for: searching for structured types of files in which the presence of harmful scripts is unlikely, and excluding the structured types of files that are found from said plurality of files.

In step 312, by the file identifier 220, method 300 generates a summary of the script based on the identified file. In one aspect, by the file identifier 220, method 300 also transmits, to a parameter calculator 230, data about the identified file and data about the generated summary of the script.

In one aspect, the summary of the script is generated by isolating a set of significant bytes and a set of excluded bytes from the identified file.

In one aspect, the set of significant bytes is isolated from the identified file by filtering the identified file using at least one filter algorithm.

In one aspect, the set of excluded bytes is obtained by removing the set of significant bytes from the identified file.

In step 313, by the parameter calculator 230, method 300 calculates static and dynamic parameters of the generated summary of the script.

In step 314, by the parameter calculator 230, method 300 recognizes a script programming language based on the calculated static parameters and dynamic parameters of the generated summary of the script using at least one language recognition rule. In one aspect, the language recognition rules are obtained from a rules database 260. In one aspect, by the parameter calculator 230, method 300 transmits data about the identified file, data about the generated summary of the script, and data about the recognized script programming language to the hash code generator 240.

In one aspect, the at least one language recognition rule includes a set of results of operations of at least one decision tree, where a presence of a result of the at least one decision tree is used to indicate that a script written in a specific programming language has been detected.

In one aspect, the static parameters of the generated summary of the script include at least one of: a list of characteristics calculated based on a set of significant bytes and a number of occurrences of comments, lines containing symbolic expressions, and constructions containing expressions of known script programming languages.

In one aspect, the dynamic parameters of the generated summary of the script include at least a list of characteristics calculated based on a number of occurrences of each type of construction containing a combination of symbols characteristic of each programming language in a set of significant bytes.

In step 315, by the hash code generator 240, method 300 processes the identified file based on the data about the recognized script programming language.

In one aspect, the processing of the identified file comprises: removing all symbols, except visible symbols, from the ASCII table, line break and space symbols and symbols from the Unicode table; removing lines containing comments and individual tagged lines characteristic of the recognized programming language; converting the text to lowercase; and indicating a start and an end of line constant characteristic of the recognized programming language.

In step 316, by the hash code generator 240, method 300 generates a set of hash codes based on a processed file using rules for generating hash codes. In one aspect, the rules for generating hash codes are obtained from the rules database 260. In one aspect, by the hash code generator 240, method 300 transmits the generated set of hash codes to the detector 250.

In one aspect, the set of hash codes is generated by: dividing the processed file into constructions containing a combination of symbols with a length of 4 to 10 symbols; calculating a number of occurrences of all detected constructions in the processed file; determining a type of hash code used using hash code generation rules; and generating the set of hash codes from hash codes of a specified type.

In one aspect, the hash code generation rules include a set of conditions, wherein, when the set of conditions is satisfied, a specified type of hash code is used.

In step 317, by the detector 250, method 300 determines whether or not the generated set of hash codes is similar to known harmful sets of hash codes. If a similarity to known harmful sets of hash codes is not present, method 300 proceeds to step 318. If a similarity to known harmful sets of hash codes is present, method 300 proceeds to step 319. In step 318, the system 200 terminated method 300. In step 319, by the detector 250, method 300 detects the harmful script.

In one aspect, the known harmful sets of hash codes are obtained from a database of script hash codes 270.

FIG. 4 is a block diagram illustrating a computer system 20 on which aspects of systems and methods for detecting harmful scripts based on a set of hash codes may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter.

In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting harmful scripts based on a set of hash codes, the method comprising:
   identifying a file containing a script, wherein the identification of the file is performed by analyzing each file of a plurality of files for a presence of a harmful script;
   generating a summary of the script based on the identified file;
   calculating static and dynamic parameters of the generated summary of the script;
   recognizing a script programming language based on inputting the calculated static parameters and dynamic parameters of the generated summary of the script into a pre-trained machine learning model;
   processing the identified file based on the data about the recognized script programming language;
   generating a set of hash codes based on a processed file using rules for generating hash codes; and
   detecting the harmful script when the generated set of hash codes is similar to known harmful sets of hash codes.

2. The method of claim 1, wherein the analysis for each file of a plurality of files for a presence of a harmful script is performed using heuristic algorithms created for:
   searching for structured types of files in which the presence of harmful scripts is unlikely, and
   excluding the structured types of files that are found from said plurality of files.

3. The method of claim 1, wherein the summary of the script is generated by isolating a set of significant bytes and a set of excluded bytes from the identified file.

4. The method of claim 3, wherein the set of significant bytes is isolated from the identified file by filtering the identified file using at least one filter algorithm.

5. The method of claim 4, wherein the set of excluded bytes is obtained by removing the set of significant bytes from the identified file.

6. The method of claim 1, wherein the pre-trained machine learning model comprises at least one language recognition rule includes a set of results of operations of at least one decision tree, where a presence of a result of the at least one decision tree is used to indicate that a script written in a specific programming language has been detected.

7. The method of claim 1, wherein the processing of the identified file comprises:
   removing all symbols, except visible symbols, from an ASCII table, line break and space symbols and symbols from a Unicode table;
   removing lines containing comments and individual tagged lines characteristic of the recognized programming language;
   converting the text to lowercase; and
   indicating a start and an end of line constant characteristic of the recognized programming language.

8. The method of claim 1, wherein the set of hash codes is generated by:
   dividing the processed file into constructions containing a combination of symbols with a length of four to ten symbols;
   calculating a number of occurrences of all detected constructions in the processed file;
   determining a type of hash code used using hash code generation rules; and
   generating the set of hash codes from hash codes of a specified type.

9. The method of claim 8, wherein the hash code generation rules include a set of conditions, wherein, when the set of conditions is satisfied, a specified type of hash code is used.

10. The method of claim 1, wherein the static parameters of the generated summary of the script include at least one of: a list of characteristics calculated based on a set of significant bytes and a number of occurrences of comments, lines containing symbolic expressions, and constructions containing expressions of known script programming languages.

11. The method of claim 1, wherein the dynamic parameters of the generated summary of the script include at least a list of characteristics calculated based on a number of occurrences of each type of construction containing a combination of symbols characteristic of each programming language in a set of significant bytes.

12. A system for detecting harmful scripts based on a set of hash codes, comprising:
at least one processor configured to:
identify a file containing a script, wherein the identification of the file is performed by analyzing each file of a plurality of files for a presence of a harmful script;
generate a summary of the script based on the identified file;
calculate static and dynamic parameters of the generated summary of the script;
recognize a script programming language based on inputting the calculated static parameters and dynamic parameters of the generated summary of the script into a pre-trained machine learning model;
process the identified file based on the data about the recognized script programming language;
generate a set of hash codes based on a processed file using rules for generating hash codes; and
detect the harmful script when the generated set of hash codes is similar to known harmful sets of hash codes.

13. The system of claim 12, wherein the analysis for each file of a plurality of files for a presence of a harmful script is performed using heuristic algorithms created for:
searching for structured types of files in which the presence of harmful scripts is unlikely, and
excluding the structured types of files that are found from said plurality of files.

14. The system of claim 12, wherein the summary of the script is generated by isolating a set of significant bytes and a set of excluded bytes from the identified file.

15. The system of claim 14, wherein the set of significant bytes is isolated from the identified file by filtering the identified file using at least one filter algorithm.

16. The system of claim 15, wherein the set of excluded bytes is obtained by removing the set of significant bytes from the identified file.

17. The system of claim 12, wherein the at least one language recognition rule includes a set of results of operations of at least one decision tree, where a presence of a result of the at least one decision tree is used to indicate that a script written in a specific programming language has been detected.

18. The system of claim 12, wherein the configuration for processing of the identified file comprises a configuration for:
removing all symbols, except visible symbols, from an ASCII table, line break and space symbols and symbols from a Unicode table;
removing lines containing comments and individual tagged lines characteristic of the recognized programming language;
converting the text to lowercase; and
indicating a start and an end of line constant characteristic of the recognized programming language.

19. The system of claim 12, wherein the set of hash codes is generated by:
dividing the processed file into constructions containing a combination of symbols with a length of four to ten symbols;
calculating a number of occurrences of all detected constructions in the processed file;
determining a type of hash code used using hash code generation rules; and
generating the set of hash codes from hash codes of a specified type.

20. A non-transitory computer readable medium storing thereon computer executable instructions for detecting harmful scripts based on a set of hash codes, including instructions for:
identifying a file containing a script, wherein the identification of the file is performed by analyzing each file of a plurality of files for a presence of a harmful script;
generating a summary of the script based on the identified file;
calculating static and dynamic parameters of the generated summary of the script;
recognizing a script programming language based on inputting the calculated static parameters and dynamic parameters of the generated summary of the script into a pre-trained machine learning model;
processing the identified file based on the data about the recognized script programming language;
generating a set of hash codes based on a processed file using rules for generating hash codes; and
detecting the harmful script when the generated set of hash codes is similar to known harmful sets of hash codes.

* * * * *